United States Patent [19]

Ishii et al.

[11] 4,128,138

[45] Dec. 5, 1978

[54] DIAPHRAGM FOR SPEAKER

[75] Inventors: Yasuhiro Ishii; Shintaro Hirose, both of Gifu; Ryoichi Kawasaki, Gunma, all of Japan

[73] Assignees: Sanyo Electric Co., Ltd., Moriguchi; Tokyo Sanyo Elctric Co., Ltd., Gunma, both of Japan

[21] Appl. No.: 752,480

[22] Filed: Dec. 20, 1976

[30] Foreign Application Priority Data

Dec. 24, 1975 [JP] Japan ................................ 50-155394

[51] Int. Cl.² ........................ H04R 7/12; G10K 13/00; B32B 3/10

[52] U.S. Cl. .................................... 181/167; 181/170; 428/64; 428/309; 428/328

[58] Field of Search ................... 428/68, 76, 304, 309, 428/312, 550, 551, 579, 306, 328, 64, 65, 66, 137, 138, 329; 181/157, 167, 168, 170, 166; 264/111, 112, 125

[56] References Cited

U.S. PATENT DOCUMENTS

| | | | |
|---|---|---|---|
| 3,111,187 | 11/1963 | Barlow | 181/168 |
| 3,264,720 | 8/1966 | Mott | 428/550 |
| 3,508,626 | 4/1970 | Robbins | 181/168 |
| 3,562,089 | 2/1971 | Warnaka et al. | 428/425 |
| 3,574,108 | 4/1971 | Lewis | 428/425 |
| 3,834,486 | 9/1974 | Tsuge et al. | 181/170 |
| 4,026,384 | 5/1977 | Yamachika et al. | 181/167 |

OTHER PUBLICATIONS

Japanese Utility Model publication 61025/1975 laid open to public in Japan on Jun. 5, 1975, 1 sht. dug., 4 p. spec.

*Primary Examiner*—William J. Van Balen
*Attorney, Agent, or Firm*—Darby & Darby

[57] ABSTRACT

A diaphragm for a dynamic cone speaker which is composed of a porous metal produced from nickel powder wherein a vinyl chloride sheet is disposed on the surface of the porous metal to eliminate the gas permeability of the porous metal.

8 Claims, 10 Drawing Figures

(0.4 KHz)

(1.9 KHz)

(0.8 KHz)

(1.0 KHz)

(1.6 KHz)

(2.0 KHz)

DIAPHRAGM FOR SPEAKER

BACKGROUND OF THE INVENTION

1. Field of the Invention

This invention relates to a diaphragm for a speaker and, more particularly, to an improvement in a material constituting such a diaphragm.

2. Description of the Prior Art

Greater lightness, larger hardness, and larger internal loss (periodic damping) are requirements in the characteristics of a diaphragm for a speaker. More specifically, the uniform operation of a diaphragm is desired in a frequency range as wide as possible with respect to an input signal in order to reproduce a high fidelity sound by the speaker. Accordingly, it is advantageous for the diaphragm to be lighter and harder. In other words, it is advantageous that the ratio E/δ be made larger where E is yound modulous and δ is density. Also, the internal loss must be made larger to prevent undesirable resonance.

A conventional diaphragm for a speaker could not satisfy all the desired features sufficiently. For example, although hard paper which was widely in common use had an advantage of lightness, it was inferior in hardness. Also, a light metal such as aluminum, titanium, beryllium, and the like was used as a diaphragm of a tweeter speaker of a small diameter. However, it was required to retain the bending strength across a large area of the diaphragm in order to use the diaphragm as a woofer speaker of a large diameter. Accordingly, the thickness of the diaphragm was required to be increased, thus resulting in an increased mass of the diaphragm as a whole. The increased mass thereof became an obstacle in the use of the light metal such as aluminum, titanium, and the like to a speaker of a large diameter. As a method of applying these light metals to a diaphragm of a speaker of a large diameter, a construction is proposed by Barlow "The Development of a Sandwich Construction Loudspeaker System", Journal of the Audio Engineering Society, June 1970, vol. 18, No. 3. wherein a porous synthetic resin is used as a damping material (core material) and it is held between light metals such as aluminum, and the like. However, such a method does not fully utilize the nature of the metals completely.

Also, in the conventional paper-made diaphragm and metal-made diaphragm, the physical conditions of the materials restrict the design conditions of the speaker unit. Thus, changes in the physical conditions of the diaphragm restrict the free selection and design of the acoustic characteristics.

SUMMARY OF THE INVENTION

The diaphragm for speaker in accordance with this invention can satisfy all the above-described characteristics sufficiently.

The diaphragm for speaker in accordance with the invention is composed of the porous metal in its approximate entirety. The porous metal is a metallic porous material, which has a porosity as high as 90 to 99%. The porous metal has the characteristics of retaining the hardness of the metal as material and reducing its weight to only several tenths of solid metal as the material. Accordingly, these characteristics of the material are extremely advantageous in case where the material is used as a diaphragm for speaker which requires a high ratio E/δ.

The porous metal is made by rolling, for example, metallic powder into the compression powder sheet of a given thickness, and thereafter sintering it in a closed furnace filled with nitrogen gas, and so on. Proper selection of the rolling conditions and the closed furnace operating conditions enables it to produce the porous metal sheet of a desired porosity and thickness.

Generally, it is understood that the area density of the diaphragm for a speaker is required to be set to 0.02 to 0.06g/cm$^2$. As the porous metal diaphragm of this invention has a very large degree of freedom concerning the selection of its properties such as porosity and thickness of the metal as a material, the porous metal diaphragm has an advantage of being capable of setting the area density freely.

The area density becomes 0.027g/cm$^2$ from the following equation;

Area density (g/cm$^2$) = density (g/cm$^3$) × thickness (cm) wherein porosity is set to 98% (apparent density 0.18g/cm$^3$), and thickness 0.15 when nickel is used as a metal material.

A material such as aluminum, titanium, beryllium, and the like is used as a porous metal. The design conditions of the speaker unit determine which material to use or the porosity and thickness of the material.

On the other hand, as the pores of the porous metal are generally in communication with each other, the metal diaghragm material is air permeable. Accordingly, when the porous metal is used as a diaphragm for speaker, the air has to be prevented from leaking from the pores during the vibration of the diaphragm. Thus, a filler is required to eliminate the permeability of the porous metal. The diaphragm for speaker in accordance with this invention contains means for eliminating the permeability of the porous metal.

As described hereinabove, it is a primary object of this invention to provide a diaphragm for a speaker which is capable of obtaining the high fidelity sounds of the original sounds.

It is another object of this invention to provide an improved construction material for a speaker diaphragm, the material being lighter and harder.

It is a further object of this invention to provide a diaphragm for speaker which can operate evenly across a wide frequency range.

It is still another object of this invention to provide a diaphragm for speaker, the internal loss thereof being made bigger in order to prevent undesirable resonance.

These and other objects and features of the invention will become more apparent from the following detailed description when taken in conjunction with the accompanying drawings.

DESCRIPTION OF THE PREFERRED EMBODIMENT

Figure 1:
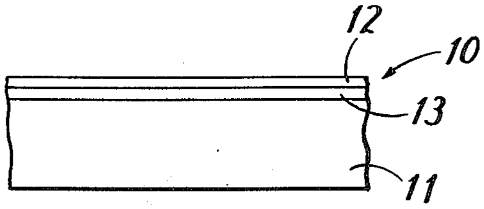
FIG. 1 is a cross-sectional view showing one embodiment of a diaphragm according to this invention.

FIG. 1 is a cross-sectional view showing one embodiment of the diaphragm made by the use of the porous metal. Referring to FIG. 1, the diaphragm 10 contains a porous metal layer 11. The porous metal constituting the layer 11 is a porous material. As many of the pores are permeable, it is required to remove the permeability in order to use the porous material as a diaphragm for speaker. Various methods are considered in order to remove the permeability. One of the typical methods is to dispose a surface layer or a filler layer 12, which is not permeable, on the surface of the porous metal layer 11. The surface layer 12, is composed of, for example, a synthetic resin sheet, metal foil, metal membrane, or the like. The surface layer 12 is securely bonded, through a layer 13 of bonding agent, on the surface of the porous metal layer 11. The bonding of the surface layer 12 can be performed through a heat-melting operation without using the bonding agent if the surface layer 12 is made of plastic sheet.

As the other method of the filling operating, application of liquid materials can be used. For example, application of damp agent with a brush, spraying of foamed agent by a sprayer, impregnation and application of colloidal solution (for example, organic compound with agarose $[C_{12}H_{14}O_5\,(OH)_4]n$ as it predominant composition) are performed, respectively, to blockade, at least the pores in the surface of the porous metal for filling operation. Sufficient care should be given to the viscosity and layer thickness of applying agent so that even filled condition can be ensured.

As further methods of the filling operation, there are a filling method of secondary foaming wherein synthetic resin particles are disposed inside the pores of the porous metal and are foamed to effect the filling operation, or a filling method of sheet forming wherein paper fiber is deposited on the surface of the porous metal to effect the filling operation.

The formation of the filled layer is normally provided only on the single side of the porous metal layer, since it performs the required function satisfactorily. However, the formation of the filled layer may be provided on both sides thereof, desired.

Figure 2:
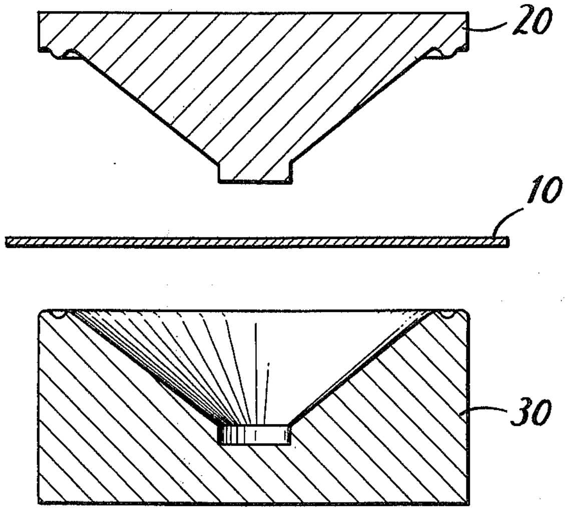
FIG. 2 is a desired view for illustrating one example of a method for forming the diaphragm of FIG. 1 into a shape.

FIG. 2 is a view for illustrating, in one example, a method for forming the diaphragm 10 shown in FIG. 1 into a cone-shaped diaphragm as a diaphragm for a dynamic core speaker. A flat-shaped diaphragm 10 is disposed between a concave metal mold 20 and a convex mold 30, and is grasped therebetween for press-working operation. Thus, the cone-shaped diaphragm is formed. Since the shape of the diaphragm which has been formed into the coneshape can be readily understood from the shapes of the metal molds 20 and 30, the drawings thereof are omitted.

The method shown in FIG. 2 includes a step of forming such a diaphragm as shown in FIG. 1, and forming it into the cone shape, the diaphragm being made of the porous metal upon which the filling operation is applied. However, the filling operation can be effected after the porous metal sheet has been formed into the cone shape. When the filling method of sheet forming such paper fiber as described above is applied, the cone-shaped diaphragm is placed upon a vessel, and the paper fiber which has been beaten is poured thereon, from above, together with water. The water flows downwardly through the pores in the porous metal while the water is being stirred. The paper fiber layer for filling purpose is disposed very thinly (to an extent the weight of the diaphragm hardly increases) on the top face of the diaphragm.

One embodiment of this invention was produced as described hereinafter. Nickel was used as a porous metal material. The pore diameter of 0.15mm$\phi$, the porosity of 98% and the diaphragm thickness of 1.5mm were provided. A speaker of 25cm in diameter was manufactured with a diaphragm, on whose front face vinyl chloride sheet of 50$\mu$ was applied. The characteristics of the speaker was shown in Table 1.

Table 1

| | E/ρ | mass of the diaphragm |
|---|---|---|
| nickel porous metal of this invention 25cm speaker | $2.2. \times 10^8$ | 8.1g |
| conventional paper vibrating body 25cm speaker | $0.49 \times 10^8$ | 9.5g |

As described hereinabove, the diaphragm of this invention is five times higher in E/δ than the diaphragm of the conventional art. Also, the mass of the diaphragm of this invention is approximately the same as that of the paper.

Comparison of the acoustic characteristics was made between cone-type speakers, one using the porous metal diaphragm of this invention and the other using the conventional paper diaphragm, the characteristics of the diaphragm being shown in the following Table 2. The construction except the diaphragm was made the same through the comparision between the both speakers.

Table 2

| | paper diaphragm | porous metal diaphragm |
|---|---|---|
| thickness | 1.3mm | 1.7mm |
| area density | $0.04g/cm^2$ | $0.05g/cm^2$ |
| core vertical angle | 114 degrees | 120 degrees |
| diameter | 25cm | 25cm |

Figure 3A:
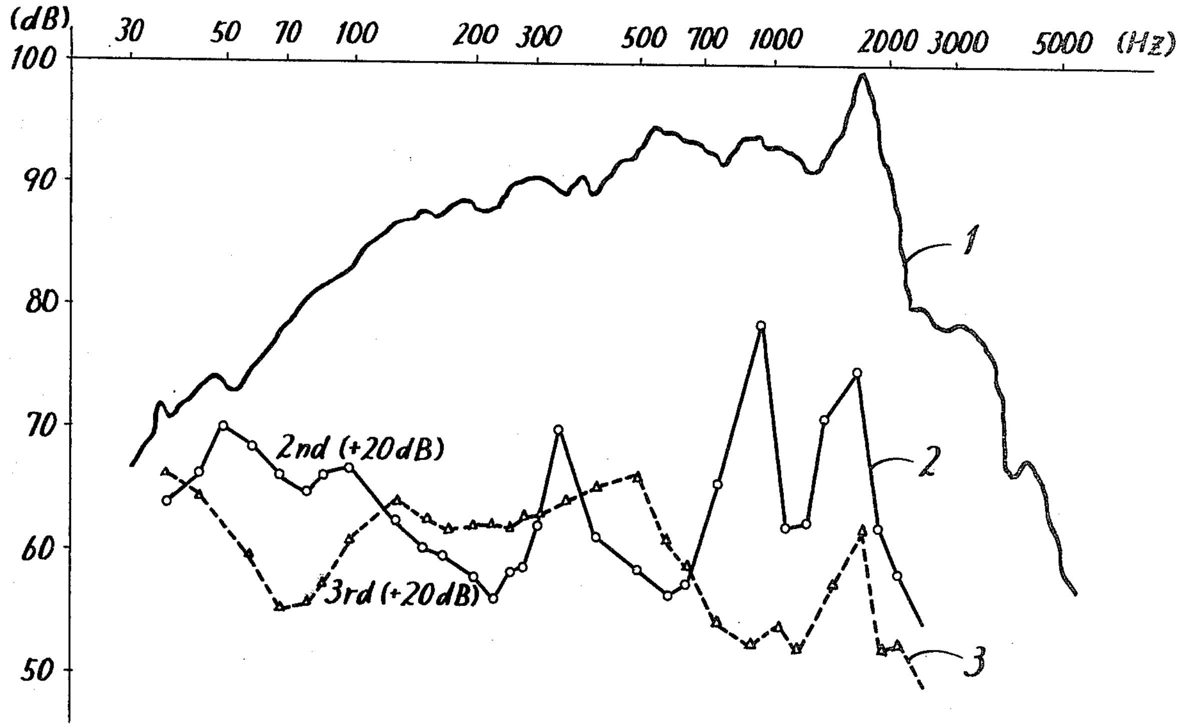
FIGS. 3A and 3B show sound pressure level-to-frequency characteristics and second, third harmonic distortions, FIG. 3A showing the characteristics of the conventional paper diaphragm, and FIG. 3B showing the characteristics of the porous metal diaphragm in accordance with the invention.
Figure 3B:
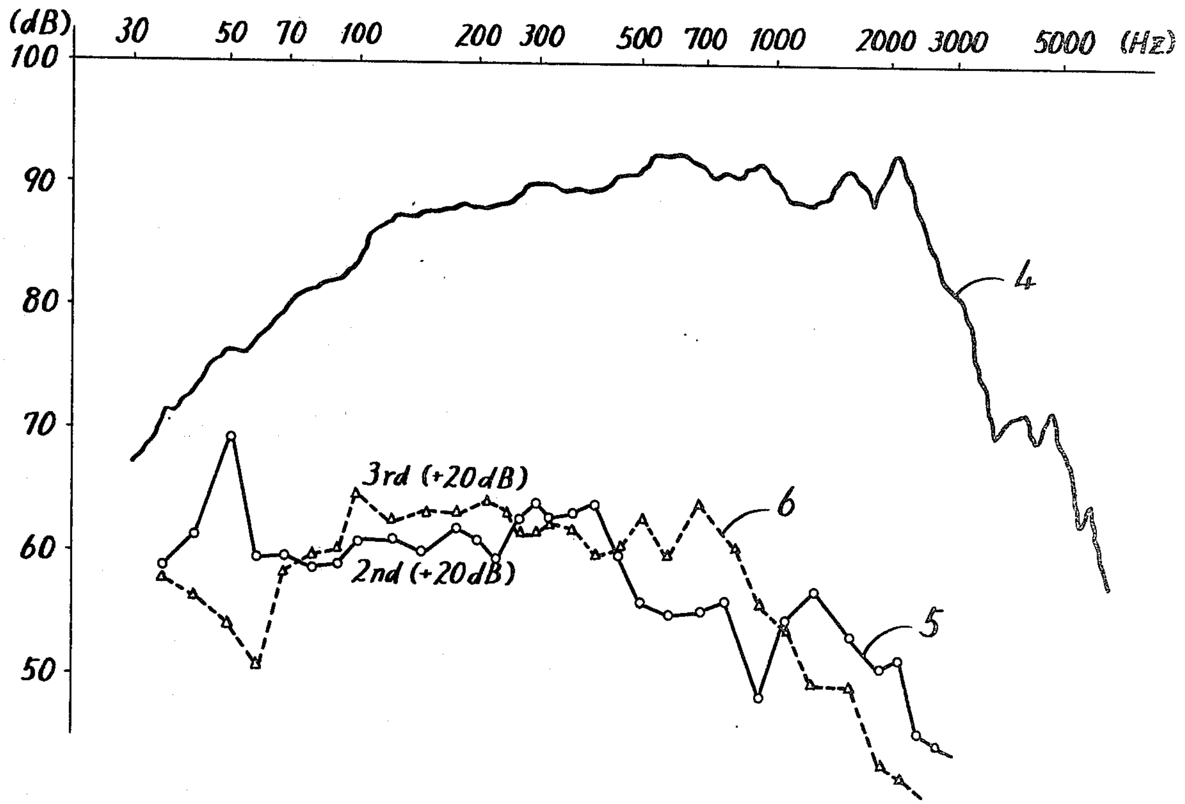

FIGS. 3A and 3B show measured characteristics of sound pressure to frequency, and measured second, third harmonic distortions. FIG. 3A shows the characteristics of the conventional paper diaphragm, while FIG. 3B shows the characteristics of the porous metal diaphragm in accordance with the present invention. The line 1 of FIG. 3A and the line 4 of the FIG. 3B show the characteristics of sound pressure to frequency. The line 2 of FIG. 3A and the line 5 of FIG. 3B show the second harmonic distortions, respectively, while the line 3 of FIG. 3A and the line 6 of FIG. 3B show the third harmonic distortions, respectively.

Figure 4A:
FIGS. 4A and 4B, and FIGS. 5A, 5B, 5C and 5D are photographic views showing the vibration appearances of the diaphragm by holography, FIGS. 4A and 4B showing the vibration appearances of the conventional diaphragm, and FIGS. 5A, 5B, 5C and 5D showing the vibration appearances of the porous metal diaphragm in accordance with this invention.
Figure 4B:
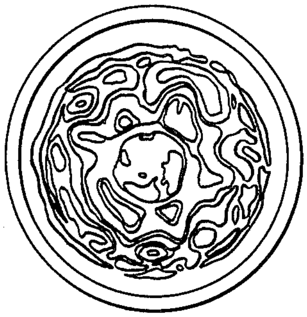

On the other hand, FIGS. 4A and 4B, and FIGS. 5A, 5B, 5C and 5D are photographic views showing the vibration appearances of the diaphragm by holography, respectively. FIGS. 4A and 4B show the vibration appearances of the conventional paper diaphragm. FIGS. 5A, 5B, 5C and 5D show the vibration appearances of the porous metal diaphragm in accordance with the present invention, respectively. Input signal frequencies are shown, respectively, inside the parentheses of each view.

As apparent from the line 1 of FIG. 3A, undesirable resonance is produced from near 400Hz. Conspicuously, the peak of 2kHz is great. However, in the line 4 of FIG. 3B of this invention, undesirable resonance is not produced up to approximately 1kHz. The undesirable resonance of approximately 1kHz or more is also small in amount and the turbulence in characteristics is less.

Figure 5A:
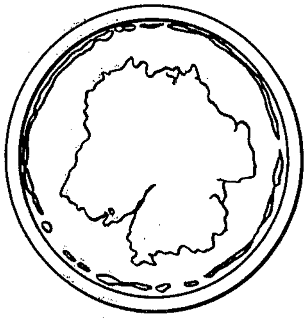
Figure 5B:
Figure 5C:
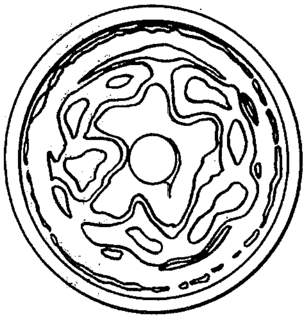
Figure 5D:
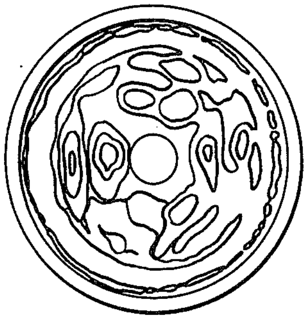

The differences in the split vibration can be understood better through the comparision between FIGS. 4A and 4B, and FIGS. 5A, 5B, 5C and 5D. In FIG. 4A, it is recognized that interference stripes are already produced, in the 0.4kHz, due to the undesirable resonance. However, referring to FIGS. 5A and 5C, distinct interference stripes can not be recognized even in approximately 0.8 to 1.6kHz. In addition, when FIG. 4B is compared with FIG. 5D, FIG. 4B shows the vibration appearances in 1.9kHz, while FIG. 5D shows the vibration appearances in 2.0kHz. FIG. 4B shows clearer interference stripes. This fact shows that the amount of the undesirable resonance is larger.

This differences in the strains can be understood through the comparisons between the lines 2 and 3 of FIG. 3A, and between the lines 5 and 6 of FIG. 3B. Through comparison therebetween, it is obvious that the second and third harmonic distortions are both produced less in FIG. 3B.

The above-described preferred embodiment of this invention is provided for illustrative purpose only. It is to be understood that the scope of this invention should be defined only by the appended claims.

What is claimed is:

1. A diaphragm for a speaker comprising:
   - a sheet for porous metal material formed from sintered metal powder and shaped in the form of the diaphragm, the pores of the metal material being void of solid material, and
   - a sheet of material substantially impermeable to air attached to and covering the active surface area of at least one surface of the diaphragm.

2. A diaphragm for a speaker as described in claim 1 wherein said impermeable material comprises a sheet of synthetic resin material.

3. A diaphragm for a speaker as described in claim 1 wherein said impermeable material comprises a sheet of metal foil.

4. A diaphragm for,a speaker as described in claim 1 wherein said impermeable material comprises a metal membrane in sheet form.

5. A diaphragm for a speaker as described in claim 1 wherein said sheet of impermeable material is attached by a bonding agent on the surface of the porous metal diaphragm.

6. A diaphragm for a speaker as described in claim 2, wherein said sheet of synthetic resin material is of a vinyl chloride composition.

7. A diaphragm for a speaker as described in claim 1 wherein said metal powder of the porous metal material for the diaphragm is selected from the group consisting of nickel, aluminum, titanium and beryllium.

8. A diaphragm for a speaker as described in claim 1 wherein the area density of said porous metal material of the diaphragm is in the range of from about 0.02 to about $0.06 g/cm^2$.

* * * * *